Nov. 28, 1939.  J. H. H. VOSS  2,181,219
FLOAT VALVE
Filed May 20, 1937
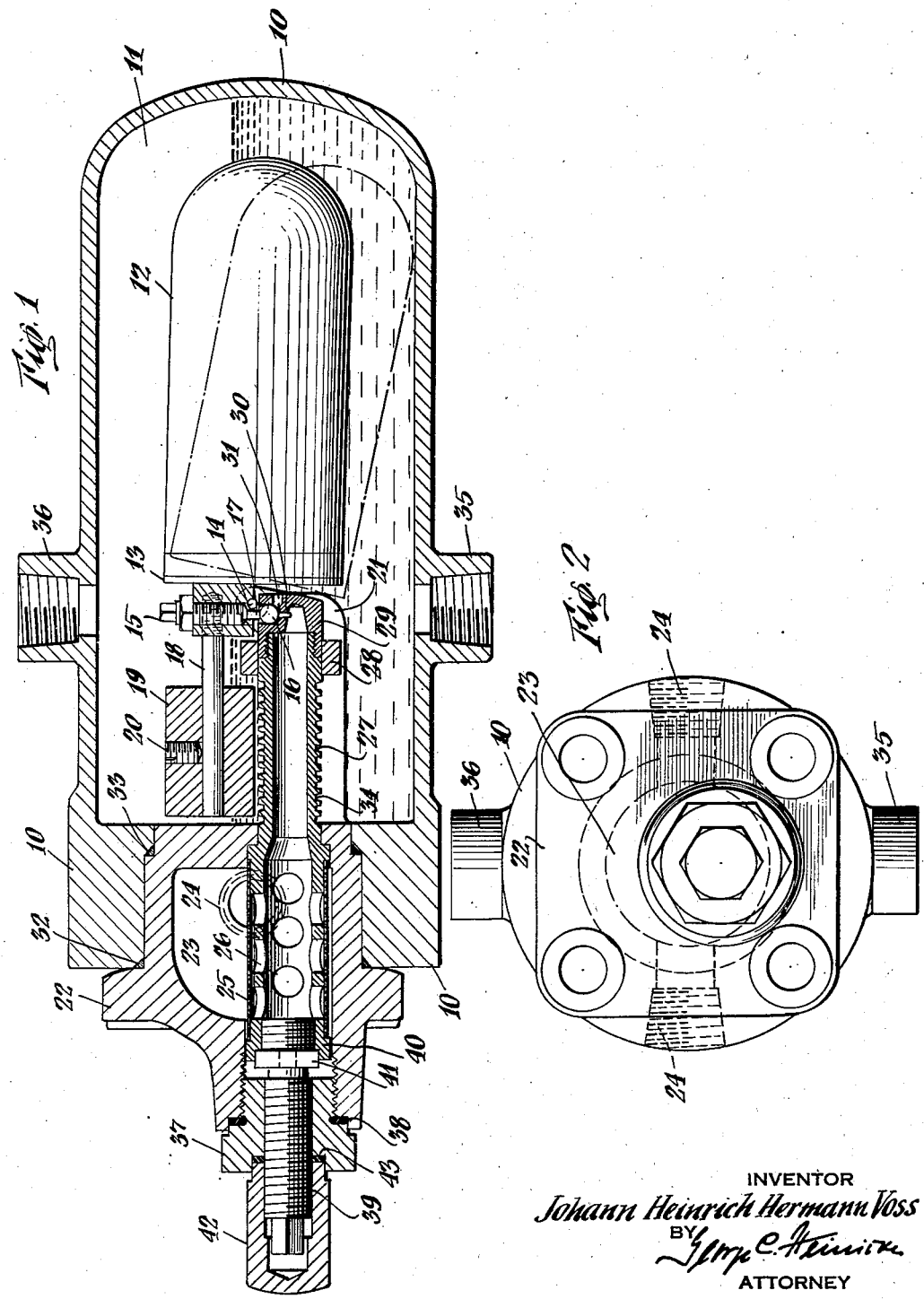
INVENTOR
Johann Heinrich Hermann Voss
BY
ATTORNEY Patented Nov. 28, 1939

2,181,219

UNITED STATES PATENT OFFICE

2,181,219

FLOAT VALVE

Johann Heinrich Hermann Voss, White Plains, N. Y.

Application May 20, 1937, Serial No. 143,649

2 Claims. (Cl. 62—127)

My invention relates to improvements in float valves, particularly intended for use with refrigerating fluids, and it is the principal object of my invention to provide a float valve which is inexpensive in its construction, and in which the orifice is located in close proximity to the pivot supporting the counterweighted float so that direct and effective leverage action may be exerted on the steel ball closure of the orifice without the interposition of additional pivots, valve stems and valve stem guides.

A further object of my invention is the provision of a float valve equipped with a large filter screen in the immediate neighborhood of the orifice to prevent the blocking of the operation by small particles of pipe scale, packing or other impurities and which, after installation can readily be inspected and adjusted by the average mechanic without interrupting the pipe connections in the liquid supply line.

A still further object of my invention is the provision of a float valve of this character equipped with a precooler for cooling and concentrating the mixture of warm liquid and gaseous refrigerant coming from the condenser or liquid receiver and so reducing the formation of flash gas to a minimum in order to obtain an increase in the passage of active liquid refrigerant, and hence obtain increased capacity of the float under varying pressure conditions, as will be understood by those experienced in the art.

These and other objects and advantages of my invention will become more fully known as the description thereof proceeds and will then be specifically defined in the appended claims.

In the accompanying drawing forming a material part of this disclosure:

Fig. 1 is a longitudinal sectional view of a float housing equipped with a valve constructed according to my invention.

Fig. 2 is an end view thereof.

As illustrated, a housing or shell 10 constituting a chamber 11 for the float 12, a hollow thin walled body which is attached at its inner end to a boss or the like on shield 13, is closed by a suitable flange to be described hereafter.

The fulcrum 14 or pivot for the float is located in the shield, and the supporting arms for the fulcrum on which the float balances are connected with the flange closing the float housing.

The adjustable set screw 15 which is held in a projection of the shield imposes pressure on a steel ball closure 16 with its reduced stem 17. The shield 13 also holds one or two rods 18 on which a weight 19 is secured by means of screws 20, to counterweight the float and to balance it on its fulcrum 14 supported by the arms 21 connected to the flange 22, mentioned above, closing the float housing.

The liquid ammonia enters the chamber 23 of the flange 22 at 24 and passes through a fine mesh screen 25 and the holes 26 and enters then the liquid precooler 27 held in a hub 28. A cap 29 is fastened on the end of the precooler and has an orifice closed by the steel ball 16, the opening 31 in the cap 29 affords passage to the liquid ammonia into the chamber 11.

The float is limited in its swing about the fulcrum 14 as the shield 13 touches the end surfaces of the arms 21 when the float is in its lowest position indicated in broken lines in Figure 1.

The flange 22 fits snugly into the open end of the float housing 10 and two gaskets 32 and 33 prevent leakage to the atmosphere on one side and leakage of the high pressure liquid in the float housing on the other side.

The outer face of the precooler may be grooved or ribbed, as at 34, to increase the heat transferred from the cold low pressure liquid in the float housing to the warm high pressure liquid coming from the condenser or receiver.

At its bottom, the housing 10 is provided with a threaded socket 35 for connection with a pipe coil in which the liquid refrigerant is boiled off to cool its surroundings, while a top outlet socket 36 serves as a vent for the flash gas and is connected from this point to the suction line of the compressor.

The flange 22 closing the housing 10, is in turn closed at its front by means of a threaded plug 37 and packing 38. A threaded bolt 39 passes through the plug 37 and presses on the plate 41 which fits into a shoulder of the threaded end 40, which is preferably made in a single piece with the precooler 27. The cap nut 42 and packing 43 close chamber 23 against the outside atmosphere.

In operation, the liquid refrigerant enters the float housing through the hollow space in the flange and passes then through the fine mesh screen and enters the liquid precooler. The gas carried by this high pressure liquid refrigerant collapses when cooled by the cold low pressure liquid refrigerant through the walls of the precooler. This cooling increases the amount of active liquid passed through the orifice and reduces the amount of flash gas entering the float chamber so that the level of the low pressure liquid refrigerant in the float chamber remains comparatively quiet thus preventing jumpy or erratic movement of the float.

During its operation the float rises from its lowest position shown in broken lines in Figure 1 when the liquid refrigerant flowing through the orifice reaches a level high enough to balance the float and finally through its force of buoyancy closes it by pressing with the end of the set screw on the steel ball over the orifice.

It will be understood that I have described and shown one form of my invention as an example only of the many possible ways to practically construct the same, and that I may make such changes therein and in the construction of its minor details as come within the scope of the appended claims without departure from the spirit of my invention and the principle involved.

Having thus described my invention, what I claim as new, and desire to secure by Letters Patent is:

1. In a float valve, preferably for refrigerating media, the combination of a float and a counterweight closely affixed to one another, and fulcrumed near their common center of gravity, a stem secured to and swinging with these parts, and arranged in such a manner that the direction of the motion of one of its ends is nearly perpendicular to the plane of the valve seat when the float is in position to stop the liquid supply, and a ball acting as a valve which is pressed against its seat by the action of said stem end, and means for adjusting the stem to the other swinging parts.

2. A float valve for refrigerating media, comprising a shell closed at one end by a chambered flange, a float in said shell open at one end, a shield closing said open end and having a boss on which said float is fulcrumed, rods on said shield carrying a counterweight for said float, a liquid precooler having a grooved outer face and held in a hub within said flange and having a cap at one end provided with an opening for admitting liquid ammonia into said shell, a ball valve seated above said opening, and an adjustable screw held in a projection of said shield to regulate said valve to control the flow of fluid from the precooler and to direct the jet of liquid discharged from the valve against the float in such manner as to exert a force tending to close said valve, said flange having a chamber and arms to support the fulcrum of said float, the chamber in said flange being connected to the said precooler and to the liquid ammonia supply.

JOHANN H. H. VOSS.